Oct. 13, 1936.  H. S. RUBENS  2,057,116
HOUSING FOR ELECTRODIC INSTRUMENTS
Filed Sept. 28, 1935   2 Sheets-Sheet 1
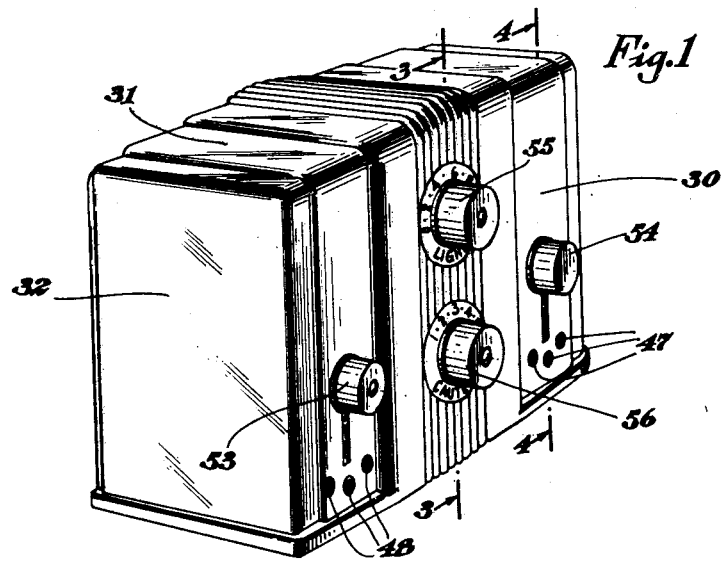
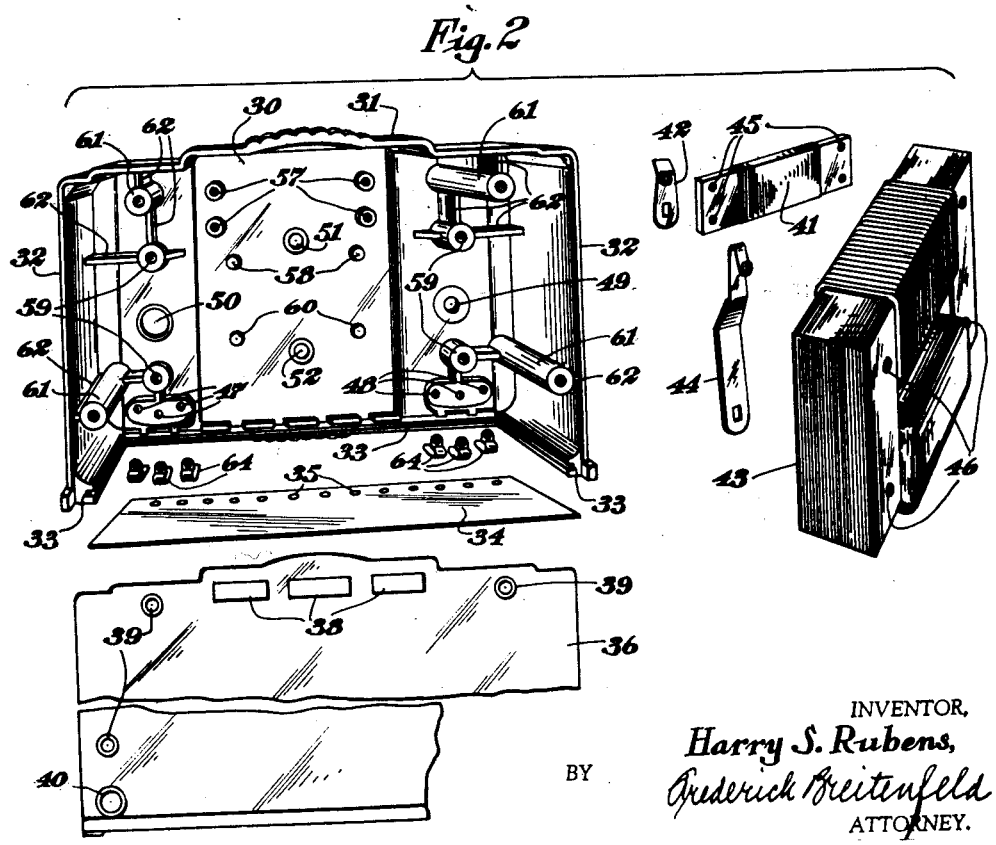
INVENTOR.
Harry S. Rubens,
BY Frederick Breitenfeld
ATTORNEY.

Oct. 13, 1936.   H. S. RUBENS   2,057,116
HOUSING FOR ELECTRODIC INSTRUMENTS
Filed Sept. 28, 1935   2 Sheets-Sheet 2
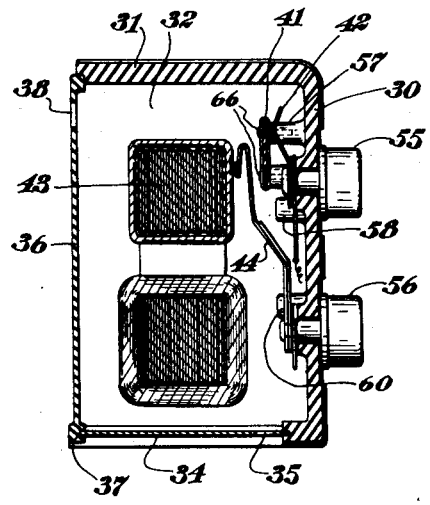
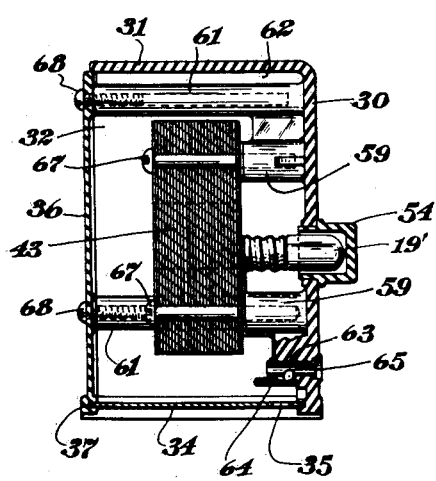
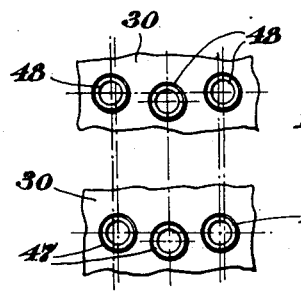
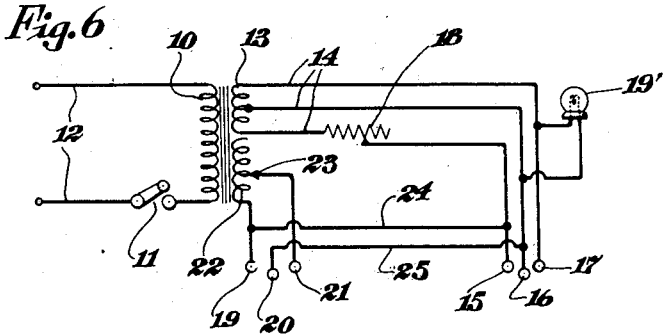
INVENTOR,
Harry S. Rubens,
BY Frederick Reitenfeld
ATTORNEY.

Patented Oct. 13, 1936

2,057,116

UNITED STATES PATENT OFFICE 2,057,116

HOUSING FOR ELECTRODIC INSTRUMENTS

Harry S. Rubens, Englewood, N. J., assignor to Comprex Oscillator Corp., New York, N. Y., a corporation of New York Application September 28, 1935, Serial No. 42,588

8 Claims. (Cl. 171—119)

My present invention relates generally to electrosurgical devices, and has particular reference to a housing for, and a unit including, certain required electrical elements.

Inasmuch as my present invention is primarily designed for an electrodic device in the nature of a cauterizing electrode, I have herein illustrated and shall hereinafter describe a housing and unit which is specifically designed for such a purpose. Nevertheless, it will be understood that certain phases of my invention are not restricted to any particular type of surgical electrode.

In the employment of a cauterizing electrode, it is necessary to afford a convenient means for the operator to connect the same to a suitable source of current, whereby the electrode proper may be caused to heat up and become operative. Where the electrode device is used with a headlight, to enable the operator to illuminate the part or area upon which he is working, it is necessary to afford an opportunity to make suitable connections with current for the headlight. These two types of current are different, and it is a particular object of the present invention to provide a unit whose employment permits both types of currents to be simultaneously rendered available for the operator.

The accomplishment of the foregoing general objective requires the provision and accommodation of a transformer, a movable contact arm for the same, a rheostat for the headlight circuit, a movable contact arm for the same, and binding posts connected in a suitable manner to different portions of the transformer secondary. In accordance with my present invention, I provide a group of three adjacent similar binding posts which are connected to the transformer in a manner affording connections across a pair of them for an electrodic instrument (such as a cautery electrode), and across another pair of them for a headlight.

One of the main objects of the present invention is to provide a unit which is unusually compact and staunch; of pleasing external appearance; easy to use and manipulate; and reliable in the sense that faulty electrical connections are rendered practically impossible.

One of the characterizing features of the present construction lies in the provision of an integral housing shell element molded of insulating material and defining end, top, and side walls, this housing, in combination with a complementary opposite end wall and an independent bottom wall, defining a complete enclosure within which the several electrical pieces of apparatus are adapted to be accommodated in an unusually compact and efficient manner.

More particularly, the present unit includes a transformer which comprises a rectangular core arranged parallel to the front wall of the housing; a purposely flattened rheostat (for the headlight circuit) arranged parallel to the front wall between the latter and the transformer; and binding posts mounted in a specially accessible and unique manner within the housing, with access openings in a wall of the shell aligned with said binding posts.

Another feature of the invention lies in the provision of specially formed and arranged pedestals or supporting parts integral with one of said molded housing elements, preferably said shell element, for the purpose of supporting the transformer, the rheostat, the binding posts, and the opposite end wall. More particularly, the present construction includes a relatively long set of pedestals for the rear end wall, a shorter set for the transformer, and a still shorter set for the rheostat, the two longer sets of pedestals being provided with longitudinal ribs integrating them with the top and side walls of the shell.

Other unique features of the invention will be set forth more fully hereinafter, all of them contributing toward the provision of a uniquely attractive and portable unit admirably adapted for electrosurgical purposes, particularly as an adjunct to the employment of an electrodic headlighted instrument.

I achieve the foregoing objects, and such other objects as may hereinafter appear or be pointed out, in the manner illustratively exemplified in the accompanying drawings, wherein—

Figure 1 is a perspective view of a unit constructed in accordance with the present invention;

Figure 2 is an exploded view showing the main elements entering into the construction, and showing the housing shell from the rear;

Figure 3 is a cross-sectional view taken substantially along the line 3—3 of Figure 1;

Figure 4 is a cross-sectional view taken substantially along the line 4—4 of Figure 1;

Figure 5 is a diagrammatic view showing the respective relationships between the two sets of binding posts; and Figure 6 is a diagrammatic view illustrating the electrical connections.

While it will be understood that the invention is not directed toward the electric circuit per se, it is believed that a brief description of Figure 6 will more clearly depict the general nature and purposes of the present unit. Referring, therefore, to this figure, it will be observed that a transformer primary 10 is arranged in series with a main switch 11, lead wires 12 extending to a suitable source of commercial current, preferably 110-volt, 60-cycle, alternating current. The transformer has two separate secondary coils. The reference numeral 13 is applied to a relatively low-current secondary from separate portions of which the three lead wires 14 extend, respectively, to the three binding posts, 15, 16 and 17. In one of these leads, a variable resistance or rheostat 18 is arranged. A pilot light 19' is shunted across the other two leads 14, so that it is not effected by adjustments of the rheostat 18.

A separate set of three binding posts 19, 20, and 21 are provided, the post 19 being connected to one end of the relatively high-current secondary 22. The post 21 is connected, in a variable manner, as indicated at 23, to another portion of the coil 22. Lead wires 24 and 25 place the binding posts 15 and 16 in shunted relationship, respectively, to the binding posts 19 and 20.

In using a cautery electrode provided with a headlight, a connection is established through a common three-pole connection plug, through the binding posts 19, 20, and 21. Across the posts 19 and 21 a variable current is rendered available for energizing the electrode proper. Across the posts 19 and 20 a variable current is rendered available, of relatively low magnitude, for energizing the headlight.

The binding posts 15, 16, and 17 are available for independent usage, for the purpose of supplying current to any other headlight which the operating surgeon may be desirous of using. A connection across the posts 15 and 16 affords a relatively low voltage, e. g., five volts; while a connection across the posts 15 and 17 affords a slightly higher voltage, e. g., ten volts. No connections are intended to be made across the posts 16 and 17, nor across the posts 20 and 21.

The general nature of the purposes of the unit being thus clarified, I will now proceed to explain the features of the present invention, providing an efficient device for housing and accommodating the various parts of Figure 6, to wit, the switch 11, the transformer, the rheostat 18, the two sets of binding posts, the pilot light 19', and the movable contact arms which travel over the coil 22 and over the rheostat 18, respectively.

An integral shell element of molded insulating material is formed to provide an end or front wall 30, a top wall 31, and opposite side walls 32. The front and side walls are provided with the grooveway 33 to slidably accommodate an independent bottom wall 34 which is preferably of metal and which is provided with the ventilating openings 35. An independent opposite end wall 36 conforms in general contour to the front end wall 30 and is preferably made of insulating material. It is provided with a grooveway 37 to fit over the rear edge of the bottom wall 34, and with ventilating openings 38 at the top. It is also provided with the four openings 39 adapted to receive fastening studs, and with the relatively large opening 40 through which the wires extend which furnish power to the transformer.

The principal elements to be accommodated within the housing are the binding posts (hereinafter to be described in greater detail), the flattened rheostat 41, the movable contact arm 42 for the rheostat, the transformer 43, and the movable contact arm 44 for the latter. The rheostat is mounted upon a supporting strip which has the openings 45 for receiving fasteners; and the transformer is similarly provided with openings 46 adapted for fastening purposes.

The front end wall 30 is provided with a set of openings 47 adapted to accommodate the binding posts 15, 16, and 17 (see Figure 6); with the similar set of openings 48 adapted to accommodate the binding posts 19, 20, and 21 (see Figure 6); and with the four additional openings 49, 50, 51, and 52. The opening 49 accommodates the spindle leading to the control knob 53, this knob actuating the main switch 11 (not shown in Figure 2). The opening 50 accommodates the pilot light 19' (not shown in Figure 2), and for purpose of ornamental symmetry this light is covered by a dummy knob 54 (see Figure 1) which is translucent so that the light can be seen through it. The opening 51 accommodates the spindle from the contact arm 42 to an external control knob 55; and the opening 52 accommodates a similar spindle from the contact arm 44 to an external control knob 56.

The order in which the parts are assembled need not be described in detail, but the unusually efficient and compact manner in which the unit may be manufactured will be readily appreciated. In the first place, a set of integral relatively short pedestals 57 is provided on the front wall 30 to accommodate studs 66 passing through the openings 45 in the rheostat. This affords support for the rheostat in a compact position close to and parallel to the front wall 30. The contact arm 42 is mounted so that its free end will sweep over the rheostat, and the movements of this contact arm are limited to approximately 180° by the integral abutments 58 provided on the front wall 30.

A second and longer set of pedestals 59 is integrally formed upon the front wall 30, and is adapted to receive studs 67 or the like passing through the openings 46 in the transformer. This permits the transformer to be mounted with its retangular core parallel to the front wall 30, thereby sandwiching the rheostat between the front wall and the transformer. The free end of the contact arm 44 is arranged to sweep over the secondary coil 22 (Figure 6), and its movements are limited to approximately 105° by virtue of the integral abutments 60 formed on the front wall 30.

A third and longest set of pedestals 61 is integrally formed on the front wall 30 and is adapted to receive fastening studs 68 or the like extending through the openings 39 of the rear wall 36.

The pedestals 59 and 60 are provided with longitudinal ribs designated generally by the reference numeral 62 and serving to integrate these pedestals with the top and side walls 31 and 32, thereby strengthening the structure.

The binding posts are of a female type and are illustrated most clearly in Figure 4, each one consisting essentially of a tube 63 and a leaf spring 64 which constantly urges a ball 65 laterally into the tube. The metal pieces ultimately forming the leaf springs 64 are designated by this reference numeral in Figure 2. Each binding post is adapted to receive a prong which is inserted longitudinally from the outside, and which makes a firm electrical contact with the metallic element 64 by virtue of the presence of the ball 65.

In contemplation of the employment of a common three-pole connection plug, hereinbefore mentioned, such plug being connected by suitable lead wires to the cautery or other electrode and to the headlight to be used therewith, it is important that the operator be prevented from inadvertently inserting such a plug into engagement with the binding posts 15, 16, and 17. For this reason, the distances between the adjacent posts of one group are purposely different from the corresponding distances between the posts of the other group. This feature of construction is most clearly illustrated in Figure 5, in which the reference numeral 30 is applied to the front wall of the housing; the numeral 47 is applied to the openings which receive the binding posts 15, 16, and 17; and the numeral 48 is applied to the openings which receive the binding posts 19, 20, and 21. The group 48 is purposely in predetermined misalignment, so that the common connection plug can be inserted in only one way. For purposes of ornamental symmetry, the group 47 is in similar predetermined misalignment. However, it will be observed that the distances between the adjacent posts of the group 48 are slightly larger than the corresponding distances between the posts 47. This makes it impossible for the operator to insert the common three-pole connection plug into the openings 47, it being understood, of course, that the connection plug is purposely of a character designed to fit accurately into the group 48.

Inasmuch as the invention relates primarily to structure, the various electrical connecting wires which are disposed within the housing to connect the several parts, as indicated in Figure 6, have been omitted from Figures 1–4. For a similar reason, the switch 11, and the details of the rheostat and transformer assembly, have been omitted.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. A housing of the character described, adapted to accommodate a transformer, binding posts for an electrodic instrument and a headlight, and a rheostat for the headlight circuit; comprising an independent rear wall, a molded shell of insulating material defining integral front, top, and side walls, and pedestals integrally formed on the interior of said shell to afford supports, respectively, for said binding posts, rheostat, transformer, and rear wall.

2. A housing of the character described, adapted to accommodate a transformer, binding posts for an electrodic instrument and a headlight, and a rheostat for the headlight circuit; comprising an independent rear wall, an independent bottom wall, a molded shell of insulating material defining integral front, top, and side walls, and pedestals integrally formed on the interior of said shell to afford supports, respectively, for said binding posts, rheostat, transformer, and rear wall, said front and side walls having a grooveway adapted to slidably accommodate and support said bottom wall.

3. A housing as set forth in claim 1, in which said pedestals include a relatively long set for the rear wall, a shorter set for the transformer, and a still shorter set for said rheostat, the two longer sets of pedestals being provided with longitudinal ribs integrating them with the top and side walls of said shell.

4. A housing of the character described, adapted to accommodate a transformer, binding posts for an electrodic instrument and a headlight, a rheostat for the headlight circuit, and movable contact arms for the transformer and rheostat, respectively; comprising an independent rear wall, a molded shell of insulating material defining integral front, top, and side walls, pedestals integrally formed on the interior of said shell to afford supports, respectively, for said binding posts, rheostat, transformer, and rear wall, and integral abutments formed on the interior of the front wall in localities limiting the movements of said movable arms.

5. A unit of the character described comprising an integral housing shell molded of insulating material and defining front, top, and side walls, a transformer in the housing and comprising a rectangular core arranged parallel to the front wall, pedestals integrally formed on the interior of said shell to support said transformer, a flat rheostat arranged parallel to the front wall between the latter and said transformer, pedestals integrally formed on the interior of said shell to support said rheostat, binding posts mounted within the housing, means electrically connecting said posts to different portions of the secondary of said transformer with the rheostat in series with one of them, and access openings in a wall of the shell aligned with said binding posts.

6. In a unit of the character described, a molded housing, a transformer within the housing, a group of three adjacent female binding posts connected to the secondary of the transformer to afford connections across a pair of them for an electrodic instrument and across another pair for a headlight for said instrument, an auxiliary group of similar binding posts to afford connections only for lights, a pair of the latter group being shunted across the headlight pair of the first-named group, and molded supporting parts integrally formed on said housing for affording supports for said transformer and binding posts, respectively.

7. In a unit of the character described, the elements of claim 6, in which the posts of each group are in similar predetermined misalignment, and the distances between the adjacent posts of one group are different from the corresponding distances between the posts of the other group.

8. A housing of the character described, adapted to accommodate a transformer and binding posts for an electrodic instrument; comprising a molded shell element of insulating material defining integral top and side walls and an end wall of the housing, a complementary molded element defining the other end wall of the housing, separate sets of molded supporting parts integrally formed on one of said molded elements and adapted to project into the housing, one set being constructed and arranged to afford supports for said binding posts and the other set being constructed and arranged to serve as pedestals for said transformer, and means extending through one of said end walls for engaging the other molded element to hold said elements together.

HARRY S. RUBENS.